UNITED STATES PATENT OFFICE.

JOHN M. HUSSEY, OF WICHITA, KANSAS.

PROCESS OF RECOVERING SUBSTANCES FROM FRESH, DECOMPOSED, OR PARTIALLY-DECOMPOSED EGGS.

1,277,727.  Specification of Letters Patent.  Patented Sept. 3, 1918.

No Drawing.  Application filed December 29, 1916. Serial No. 139,537.

*To all whom it may concern:*

Be it known that I, JOHN M. HUSSEY, a citizen of the United States, and a resident of Wichita, in the county of Sedgwick and State of Kansas, have invented an Improvemen in Processes of Recovering Substances from Fresh, Decomposed, or Partially-Decomposed Eggs, of which the following description is a specification.

This invention relates to a method or methods employed in recovering certain substances from fresh, decomposed, or partially decomposed eggs.

Fresh, and partially or totally decomposed, eggs contain certain substances which it is the province of my invention to recover. Certain of the substances recovered by me in accordance with my invention are albumen, vitellin, egg yoke oil and lecithin. In the recovering of these or other substances, I preferably, in the practice of my invention, proceed substantially as follows:

The eggs to be treated are broken into casks or other suitable receptacles with fifteen per cent. by weight of salt, thus forming a brine that dissolves the vitellin, the latter being held in solution. The said mixture is drawn off into a working vat, and carbontetrachlorid, trichlorethylene, or similar solvent is added, together with methyl-alcohol, in sufficient quantities to dissolve the oils and fats and to precipitate the albumen. The fat solvents with the dissolved fats and oils, including vitellin and lecithin, are drawn off into another vat or receptacle. The precipitated albumen is thereupon strained out and placed in a separate vat. The methyl-alcohol, the saline vitellin solution and water are drawn off into a separate vat. The fat solvent and the oil, including the lecithin, are placed in a retort and the fat solvent is distilled off, thus recovering it for indefinite re-use, or the oil including the lecithin may be separated from the solvent by refrigeration, or by centrifugal separator. The oil and lecithin remaining in the retort are transferred to another receptacle, and the fat solvent and acetone are added in sufficient quantities to effect the dissolving of the oil by the fat solvent and the precipitation of the lecithin by the acetone. Thereupon the precipitated lecithin is strained out and the acetone and fat solvent are separated from the oil by distillation, refrigeration, or by centrifugal separator.

From the methyl-alcohol and saline vitellin solution and water previously drawn off, the alcohol is distilled off, nearly all of it being recovered by distillation at different temperatures, and the vitellin is recovered from the remaining saline solution by adding sufficient water to carry off the salt, thus leaving the vitellin as a precipitate when the salt is removed. The temperatures used in distillation are so low that the products are not injured by the heat.

The substances recovered by this method are albumen, vitellin, egg oil, and lecithin, all of which are useful in the arts.

Having thus described the method employed by me in carrying out my invention, I desire it to be understood that although specific terms are employed, they are used in a generic and descriptive sense and not for purposes of limitation, the scope of the invention being set forth in the following claims.

Claims:

1. That method of recovering substances from fresh, or decomposed or partially decomposed eggs comprising, adding carbontetrachlorid, and methyl-alcohol to fresh, decomposed, or partially decomposed, eggs, in quantities sufficient to dissolve the oils and fats and to precipitate the albumen.

2. That method of recovering substances from fresh, or decomposed or partially decomposed eggs comprising, adding carbontetrachlorid, and methyl-alcohol to fresh, decomposed, or partially decomposed, eggs in quantities sufficient to dissolve the oils and fats and to precipitate the albumen, drawing off the fat solvent, the dissolved oils and fats, and straining out the albumen.

3. That method of recovering substances from fresh, or decomposed or partially decomposed eggs comprising, adding sufficient salt by weight to form a brine to fresh, decomposed, or partially decomposed, eggs, adding carbontetrachlorid, and methyl-alcohol in sufficient quantities to dissolve the oils and fats and precipitate the albumen, drawing off the methyl-alcohol, saline vitellin solution, separating out the fat solvent, oil and lecithin, and separating the fat solvent from oil and lecithin by distillation, refrigeration, or centrifugal separator.

4. That method of recovering substances from fresh, or decomposed or partially decomposed eggs comprising, adding sufficient salt by weight to fresh, decomposed, or partially decomposed, eggs to form a brine, adding carbontetrachlorid, and methyl-alcohol in sufficient quatities to dissolve the oils and fats and precipitate the albumen, straining out the albumen, separating the fat solvent from the oil and lecithin, and adding to these a fat solvent and acetone in sufficient quantities to dissolve the oil and precipitate the lecithin.

5. That method of recovering substance from fresh, or decomposed or partially decomposed eggs comprising, adding sufficient salt by weight to fresh, decomposed, or partially decomposed, eggs to form a brine, adding carbontetrachorid, and methyl-alcohol in sufficient quantities to dissolve the oils and fats and precipitate the albumen, straining out the albumen, separating the fat solvent from the oil and lecithin, adding to these a fat solvent and acetone in sufficient quantities to dissolve the oil and precipitate the lecithin, straining out the precipitated lecithin, and separting the acetone and fat solvent from the oil.

6. That method of recovering substances from fresh, or decomposed or partially decomposed eggs comprising, adding sufficient salt by weight to fresh, decomposed, or partially decomposed, eggs to form a brine, adding carbontetrachorid, and methyl-alcohol in quantities sufficient to dissolve the oils and fats and precipitate the albumen, straining out the albumen, drawing off the fat solvent and the dissolved oils and fats, including lecithin, drawing off the methyl-alcohol and saline vitellin solution and water, and distilling off the alcohol therefrom.

7. That method of recovering substances from fresh, or decomposed or partially decomposed eggs comprising, adding sufficient salt by weight to fresh, decomposed, or partially decomposed, eggs to form a brine, adding carbontetrachlorid, and methyl-alcohol in quantities sufficient to dissolve the oils and fats and precipitate the albumen, straining out the albumen, drawing off the fat solvent and the dissolved oils an l fats, including lecithin, drawing off the methyl-alcohol and saline vitellin solution and water, distilling off the alcohol therefrom and recovering the vitellin from the remaining saline solution by adding sufficient quantity of water to carry off the salt.

8. That method of recovering substances from fresh, or decomposed or partially decomposed eggs comprising, adding sufficient salt by weight to fresh, decomposed, or partially decomposed, eggs to form a brine, thus dissolving the vitellin, adding carbontetrachlorid, and methyl-alcohol in sufficient quantities to dissolve the oils and fats and precipitate the albumen, drawing off the fat solvent and dissolved oils and fats, including lecithin, straining out the precipitated albumen, drawing off the methyl-alcohol, saline vitellin solution and water, recovering the fat solvent from the dissolved oil and lecithin, adding the fat solvent and acetone to the oil and lecithin in sufficient quantities to dissolve the oil and precipitate the lecithin, straining out the percipitated lecithin, recovering the acetone and fat solvent, distilling off the alcohol from the methyl-alcohol, water and saline solution of vitellin, and recovering the vitellin from the remaining saline solution by adding sufficient water to carry off the salt, thereby leaving the vitellin as a precipitate.

9. That method of recovering substances from fresh, decomposed or partially decomposed eggs comprising adding salt in solid form to such eggs, thereby obtaining a partially liquid substance having vitellin in solution.

10. That method of recovering substances from fresh, decomposed or partially decomposed eggs comprising adding a fat solvent thereto in quantities sufficient to dissolve the oils and fats and to precipitate the albumen.

11. That method of recovering substances from fresh, decomposed or partially decomposed eggs comprising adding a fat solvent and methyl-alcohol to said eggs in quantities sufficient to dissolve the oils and fats and to precipitate the albumen.

In testimony whereof, I have signed my name to this specification.

JOHN M. HUSSEY.